(12) United States Patent
Sultenfuss et al.

(10) Patent No.: US 7,596,687 B2
(45) Date of Patent: Sep. 29, 2009

(54) SYSTEM AND METHOD FOR INFORMATION HANDLING SYSTEM INTEROPERABLE FIRMWARE STORAGE

(75) Inventors: Andrew T. Sultenfuss, Leander, TX (US); Ronald D. Shaw, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 480 days.

(21) Appl. No.: 11/145,599

(22) Filed: Jun. 6, 2005

(65) Prior Publication Data
US 2006/0277401 A1 Dec. 7, 2006

(51) Int. Cl.
G06F 9/00 (2006.01)
G06F 12/00 (2006.01)
G06F 13/38 (2006.01)
G06F 15/177 (2006.01)

(52) U.S. Cl. .............................. 713/100; 713/1; 713/2; 710/240; 710/244; 714/43

(58) Field of Classification Search ..................... 713/1, 713/2, 100; 710/240, 244; 714/43
See application file for complete search history.

(56) References Cited

U.S. PATENT DOCUMENTS

| | | | | |
|---|---|---|---|---|
| 5,825,878 A * | 10/1998 | Takahashi et al. | ........... | 713/190 |
| 6,370,642 B1 * | 4/2002 | Chiang et al. | .................. | 713/1 |
| 6,529,989 B1 * | 3/2003 | Bashford et al. | ............ | 710/306 |
| 7,376,870 B2 * | 5/2008 | Kataria et al. | ................. | 714/47 |
| 2003/0084307 A1 * | 5/2003 | Schwartz | .................... | 713/189 |
| 2005/0204078 A1 * | 9/2005 | Steinmetz et al. | ............. | 710/38 |
| 2006/0091943 A1 * | 5/2006 | Noorbakhsh et al. | ........ | 327/603 |

* cited by examiner

*Primary Examiner*—Thomas Lee
*Assistant Examiner*—Michael J Brown
(74) *Attorney, Agent, or Firm*—Hamilton & Terrile, LLP; Robert W. Holland

(57) ABSTRACT

Interoperable firmware for an information handling system supports embedded controller and chipset operations from a common SPI flash ROM. The embedded controller is disposed between the chipset and the flash ROM with a pass through port integrated in the embedded controller selectively providing primary access to firmware by the chipset or the embedded controller. The pass through port provides chipset access to firmware without inducing delays for normal system operations, yet provides an integrated switch for control and access of the firmware by the embedded controller for updating of firmware settings and firmware diagnostics. Application of power to the embedded controller allows access to chipset firmware even where the chipset lacks power, such as during manufacture of the information handling system.

18 Claims, 1 Drawing Sheet

SYSTEM AND METHOD FOR INFORMATION HANDLING SYSTEM INTEROPERABLE FIRMWARE STORAGE

BACKGROUND OF THE INVENTION

1. Field of the Invention

The present invention relates in general to the field of information handling system storage, and more particularly to a system and method for information handling system interoperable firmware storage.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include a number of physical components that run under the control of an operating system. The operating system runs on the central processing unit of the information handling system and interacts with other components through a Basic Input/Output System (BIOS). The BIOS is generally firmware that runs on multiple integrated processors in a system chipset, such as the INTEL ICH7M chipset. In some systems, specifically portable information handling systems, an embedded controller interfaces with the chipset to handle keyboard and power management functions. The embedded controller typically includes its own flash memory and BIOS firmware. The design of the chipset and embedded controller firmware presents a substantial challenge since multiple physical devices are involved that reside in multiple areas of the motherboard, reside in multiple voltage planes, communicate through multiple bus topologies and have multiple degrees of security.

These challenges have increased with the complexity of information handling systems resulting in greater amounts of firmware code and increased flash memory requirements. Increased BIOS storage have led to increased ISA flash memory density pincount to maintain access speed. Greater pincounts result in an increase in footprint with corresponding difficulties impacting motherboard layout. In addition, increased pincounts for greater access speeds, such as are available with single chip firmware hub solutions, increases system expense. An alternative is to integrate flash with components, such as the embedded controller, but integrated flash increases costs and introduces delays for upgrades as new die is designed, tested and produced. As a possible solution, Serial Peripheral Interface ROMs are sometimes added to chipsets. However SPI speed is slow so that execution of firmware from SPI is limiting. The slow access speeds of SPI make it impractical for an embedded controller to effectively control an information handling system without shadowing the ROM, which increases system cost.

SUMMARY OF THE INVENTION

Therefore a need has arisen for a system and method which provides interoperable information handling system firmware storage.

In accordance with the present invention, a system and method are provided which substantially reduce the disadvantages and problems associated with previous methods and systems for information handling system firmware storage. Chipset firmware stored in flash memory is accessed through an embedded controller pass through port. The embedded controller selectively interfaces itself or the chipset with the firmware by control of the pass through port.

More specifically, an information handling system has plural processing components to process information. Communication between the processing components at a physical layer is managed by a chipset running instructions in BIOS firmware stored on a SPI flash ROM. Power management and interactions with input devices are managed by an embedded controller interfaced with the chipset and the SPI flash ROM. The embedded controller has a pass through port disposed between the chipset and the ROM to selectively control communications between the ROM, the chipset and the embedded controller. In normal operations, the chipset retrieves firmware from the ROM without arbitration or intervention by the embedded controller. When access to firmware by the embedded controller is desired, the pass through port gives primary access to the embedded controller. Thus, event with the information handling system running, the embedded controller has access to change BIOS firmware settings or to perform diagnostics on firmware, such as testing, reprogramming, and verification. In one embodiment, BIOS firmware is updated with power applied to the embedded controller even if power is absent from the chipset, such as during manufacture of an information handling system.

The present invention provides a number of important technical advantages. One example of an important technical advantage is that interoperable storage of firmware allows a single SPI flash ROM to support both chipset and embedded controller operations. Normal operations support BIOS firmware running on the chipset at normal execution speeds with the pass through port having minimal impact on communication between the chipset and firmware. Alteration of the pass through port to have primary access by the embedded controller provides a platform to upgrade, test and maintain firmware without interference of chipset operations. Further, the embedded controller provides access to firmware even with the chipset powered down.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
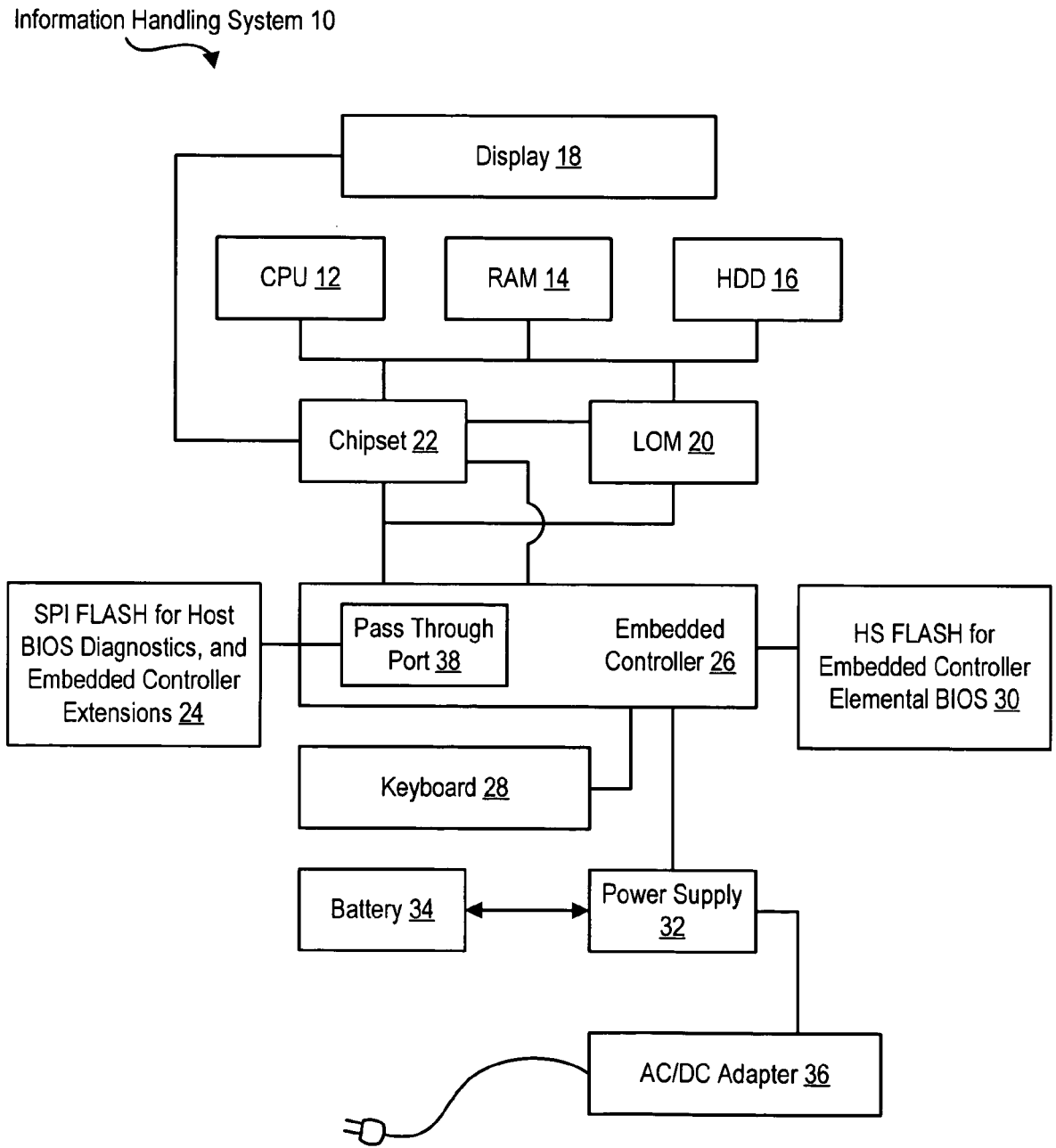
FIG. 1 depicts a block diagram of an information handling system having interoperable firmware storage.

Interoperable information handling system firmware is selectively accessed by an embedded controller or chipset by activation of a pass through port of the embedded controller disposed between the chipset and SPI flash ROM that stores the firmware. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to FIG. 1, a block diagram depicts an information handling system 10 having interoperable firmware storage. Information handling system 10 includes plural processing components for processing information, including a CPU 12, RAM 14, a hard disk drive (HDD) 16, a display 18 and a LAN on motherboard (LOM) for network communications. Physical communications between the processing components is managed by a chipset 22, such as the ICH7M chipset available from INTEL, which is a set of integrated circuit and other hardware components. The operation of the chipset is managed by BIOS firmware stored on a SPI flash ROM 24. On initial power up of information handling system 10, chipset 22 retrieves the BIOS firmware to initiate operation of the processing components, including retrieval of the operating system from hard disk drive 16. An embedded controller 26, also referred to as a keyboard controller, interfaces with chipset 22 to perform power management and process inputs from devices such as a keyboard 28 and mouse. Embedded controller 26 operates with embedded controller elemental BIOS firmware stored in a HS hash ROM 30 and on various extensions stored in SPI flash ROM 24. Embedded controller 26 interfaces with a power supply 32 to manage distribution of power to various physical components from an internal battery 34 or an external power adapter 36. In alternative embodiments, other types of serial storage devices and interfaces may be used in the place of or in addition to SPI devices and interfaces.

Chipset 22 communicates with BIOS firmware stored on SPI flash ROM 24 through a pass through port 38 integrated in embedded controller 26. Embedded controller 26 acts as form of integrated switch that selectively controls access to firmware in ROM 24 by itself or chipset 22. For instance, during normal operations pass through port 38 allows primary access directly between chipset 22 and ROM 24 without interference or processing by embedded controller 26. However, embedded controller 26 can selectively alter the operation of pass through port 38 to have primary access to ROM 24 without interference by chipset 22. If a networking LOM 20 is integrated in information handling system 10, an interface between LOM 20 and ROM 24 is also established through pass through port 38. Under normal operating conditions, pass through port 38 is configured to have primary access to chipset 22 and LOM 20 without arbitrage by embedded controller 26 so that all communications between chipset 22 or LOM 20 and ROM 24 are accomplished without interference by embedded controller 26. If embedded controller 26 assumes priority access to ROM 24, an arbitrage pin activated on chipset 22 holds communications from chipset 22 and LOM 20 until priority access is released by embedded controller 26. Thus, embedded controller 26 and chipset 22 effectively share ROM 24 with minimal impact on the operations of information handling system 10.

Interoperable firmware in ROM 24 increases the flexibility for manufacturers in the design, implementation and testing of information handling system firmware. For instance, pass through port 38 looks as an SPI flash ROM to the host BIOS running on chipset 22 but allows access of embedded controller 26 when the host is not available or inaccurate. As embedded controller 26 operates the power conditions of the processing components, it has the capability to access ROM 24 to operate, program, test, verify, and update BIOS firmware as its own while allowing normal operations of the host information handling system at full speed. Thus, for instance, the embedded controller provides a tool for changing BIOS settings by altering firmware in SPI flash ROM 24 that is subsequently applied by chipset 22. As another example, embedded controller 26 provides a tool for programming BIOS firmware when power is unavailable or not applied to chipset 22, such as during manufacture of the information handling system.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to process information;
   a chipset interfaced with the processing components and operable to manage interfacing of the processing components at a physical layer;
   an embedded controller interfaced with but separate from the chipset and operable to manage power to the processing components, the embedded controller having a pass through port; and
   flash ROM interfaced with the embedded controller, the flash ROM storing firmware for operation by the chipset and for operation by the embedded controller, the chipset operable to interface with the flash ROM through the pass through port;
   wherein the embedded controller is further operable to select primary access to the flash ROM by the chipset or primary access by the embedded controller.

2. The information handling system of claim 1 wherein the flash ROM comprises SPI flash ROM.

3. The information handling system of claim 1 wherein the embedded controller is further operable to assume primary access to the flash ROM to change chipset firmware settings.

4. The information handling system of claim 1 wherein the embedded controller is further operable to assume primary access to the flash ROM to perform firmware diagnostics.

5. The information handling system of claim 1 wherein the embedded controller automatically assumes primary access if the chipset lacks power.

6. The information handling system of claim 1 further comprising a LOM interfaced with the chipset and with the pass through port, the LOM operable to access firmware on the flash ROM.

7. A method for managing interoperable firmware of an information handling system, the method comprising:

storing executable firmware on a flash ROM;
connecting the flash ROM to an embedded controller;
connecting a chipset to the embedded controller;
communicating the executable firmware between the chipset and the flash ROM by passing information through the embedded controller;
executing the executable firmware on the chipset; and
selectively accessing, by one of the embedded controller or the chipset, the executable firmware from the flash ROM.

8. The method of claim 7 wherein the flash ROM comprises a SPI flash ROM.

9. The method of claim 7 further comprising:
connecting a LOM to the embedded controller; and
communicating between the LOM and the flash ROM by passing information through the embedded controller.

10. The method of claim 7 wherein selectively accessing the firmware with the embedded controller further comprises:
changing with the embedded controller one or more firmware settings associated with the chipset.

11. The method of claim 7 wherein selectively accessing the firmware with the embedded controller further comprises:
running diagnostics with the embedded controller on chipset firmware.

12. The method of claim 7 wherein selectively accessing the firmware with the embedded controller further comprises:
powering down the chipset;
powering up the embedded controller; and
interacting with chipset firmware through the embedded controller.

13. The method of claim 7 wherein selectively accessing the firmware with the embedded controller further comprises:
altering the chipset firmware with the embedded controller while running the chipset.

14. The method of claim 7 wherein selectively accessing the firmware with the embedded controller further comprises:
selectively activating an arbitrage pin of the chipset for the embedded controller to have primary access to the flash ROM.

15. A system for managing interoperable firmware of an information handling system, the system comprising:
a chipset operable to coordinate communication between processing components of the information handling system;
an embedded controller operable to coordinate power management of processing components of the information handling system;
a flash ROM connected to the embedded controller and storing the firmware, the embedded controller operable to selectively access the firmware; and
a pass through port integrated in the embedded controller to selectively interface the chipset with the firmware;
wherein the embedded controller is further operable to default primary access to the firmware by the chipset and to activate primary access to the firmware by the embedded controller if the chipset lacks power.

16. The system of claim 15 wherein the embedded controller is further operable to alter the firmware while the chipset operates.

17. The system of claim 16 wherein the embedded controller alters firmware settings for operation of the chipset.

18. The system of claim 16 wherein the flash ROM comprises SPI flash ROM.

* * * * *

UNITED STATES PATENT AND TRADEMARK OFFICE
CERTIFICATE OF CORRECTION

PATENT NO. : 7,596,687 B2 Page 1 of 1
APPLICATION NO. : 11/145599
DATED : September 29, 2009
INVENTOR(S) : Sultenfuss et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 730 days.

Signed and Sealed this

Twenty-eighth Day of September, 2010

David J. Kappos
*Director of the United States Patent and Trademark Office*